2,061,223

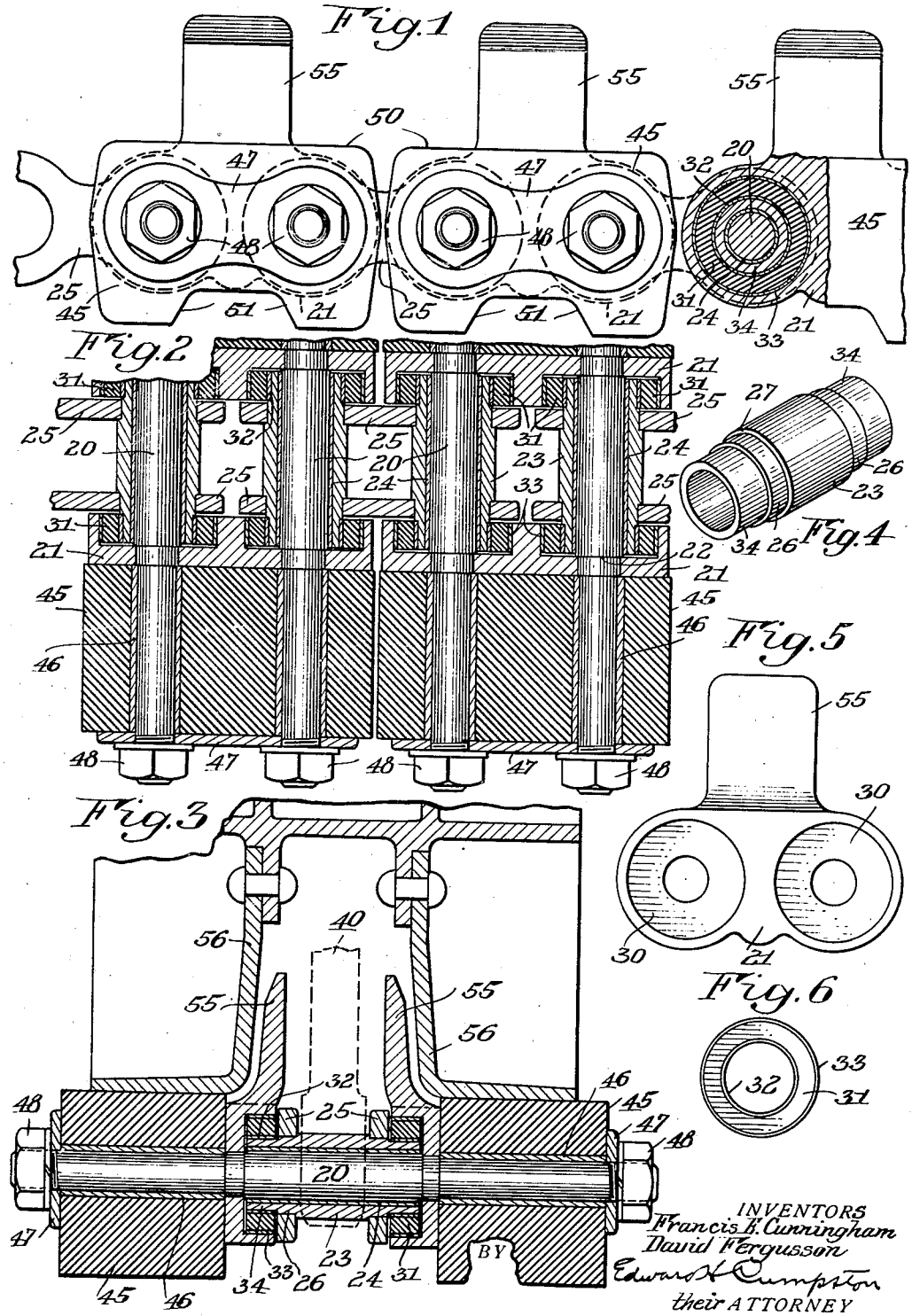
Nov. 17, 1936. F. E. CUNNINGHAM ET AL. 2,061,223
CHAIN CONSTRUCTION
Filed Oct. 5, 1933 3 Sheets-Sheet 1
INVENTORS
Francis E. Cunningham
David Fergusson
their ATTORNEY Nov. 17, 1936.                F. E. CUNNINGHAM ET AL                 2,061,223
CHAIN CONSTRUCTION
Filed Oct. 5, 1933                                              3 Sheets—Sheet 2
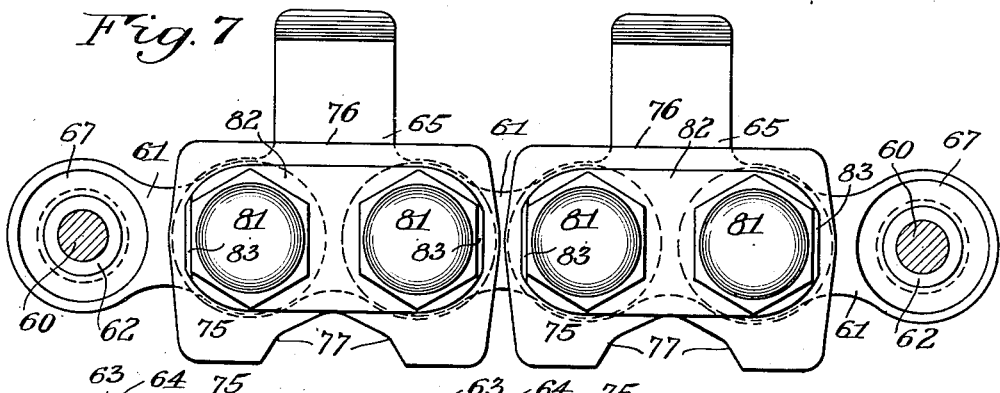
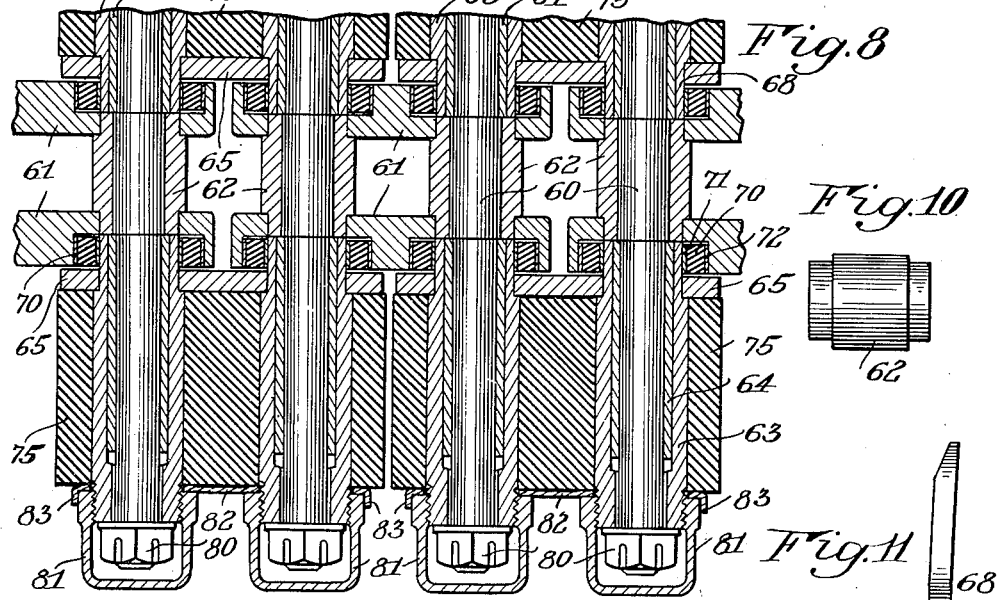
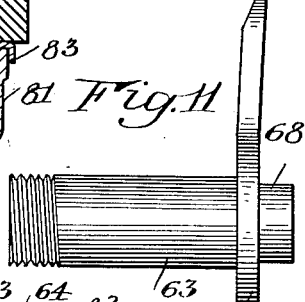
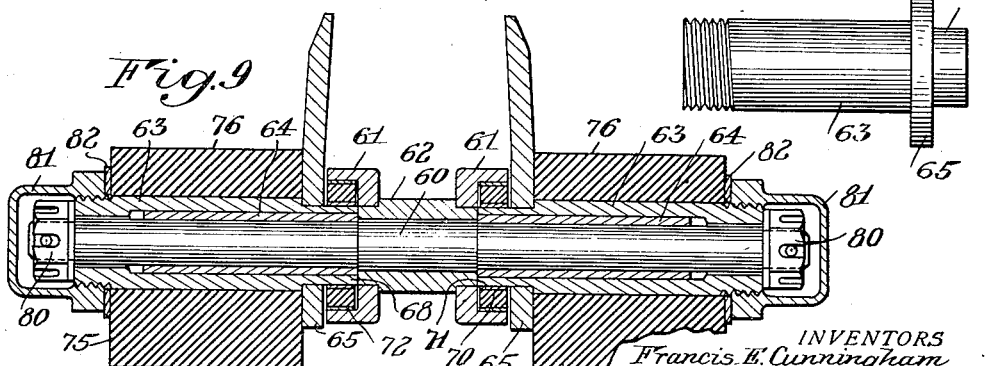
INVENTORS
Francis E. Cunningham
David Fergusson
BY Edward H. Cumpston
their ATTORNEY Nov. 17, 1936.  F. E. CUNNINGHAM ET AL  2,061,223
CHAIN CONSTRUCTION
Filed Oct. 5, 1933  3 Sheets-Sheet 3
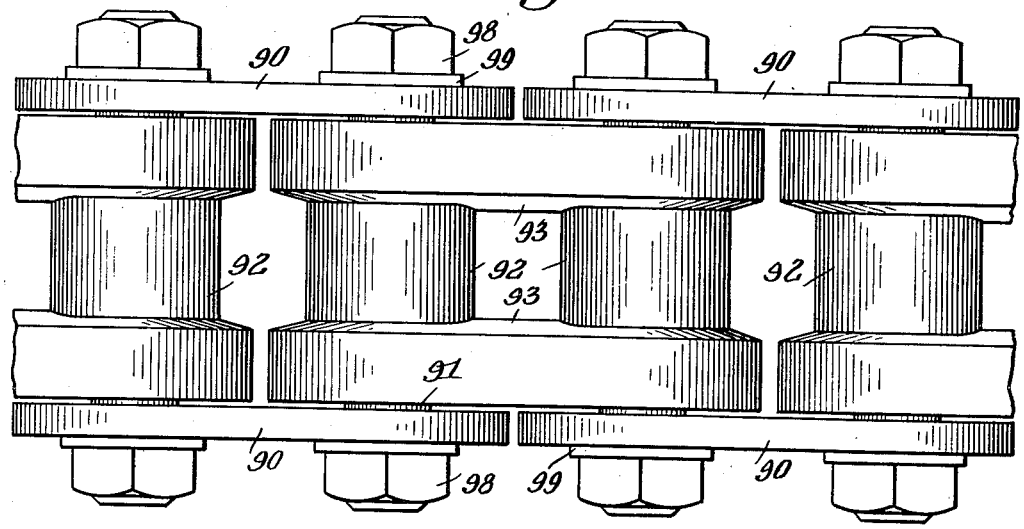
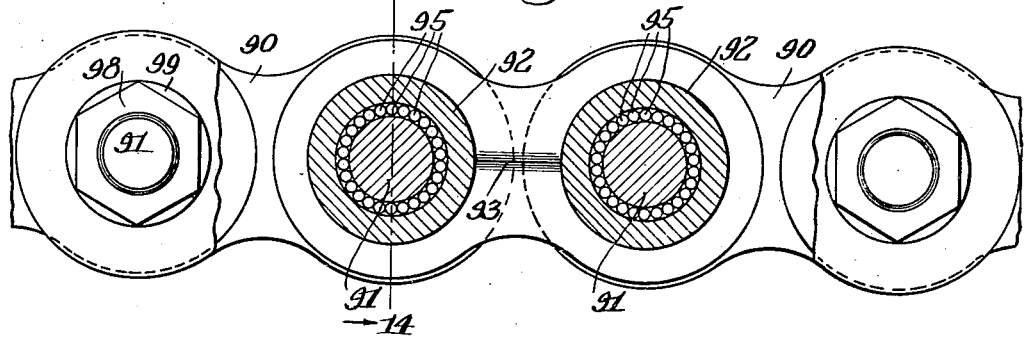
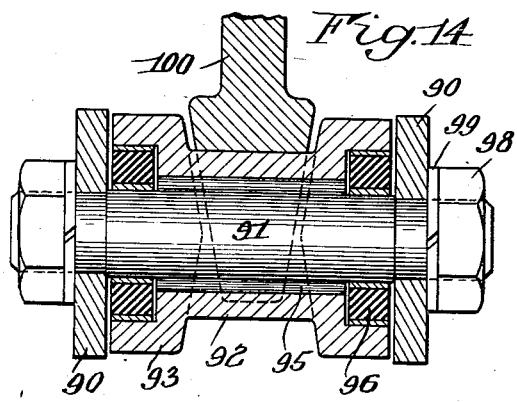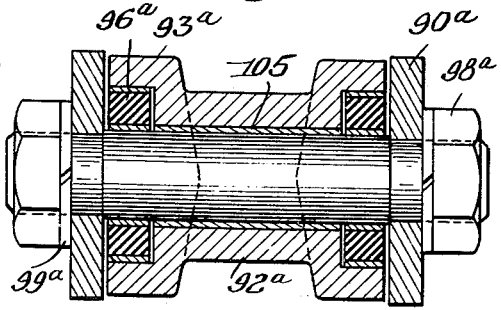
INVENTORS
Francis E. Cunningham
David Fergusson
BY Edward L. Cumpston
their ATTORNEY Patented Nov. 17, 1936

UNITED STATES PATENT OFFICE 2,061,223

CHAIN CONSTRUCTION

Francis E. Cunningham and David Fergusson, Rochester, N. Y., assignors to James Cunningham, Son & Company, Rochester, N. Y., a corporation of New York Application October 5, 1933, Serial No. 692,308

11 Claims. (Cl. 305—10)

This invention relates to the construction of chains and has for one object the provision of a generally improved and more satisfactory chain capable of a wide variety of uses, and able to stand up under rough usage, as for example where dust, sand, or other gritty substances are present.

Another object of the invention is to provide a chain with sealing means to prevent access of dust or sand to the chain bearings, so that it will operate smoothly and efficiently irrespective of dust or sand, and will have a relatively long operating life.

Still another object is the provision of a chain so constructed that the parts most likely to wear out may be easily removed and replaced.

A further object of the invention is the provision of a chain adapted especially for use as a track for vehicles of the track laying type, of rugged construction, and capable of operating satisfactorily under adverse conditions.

A still further object is the provision, in such a chain, of sealing means for preventing entrance of sand or other foreign matter into the joints of the chains, so that sand or grit will not cause an abrasive action on the joint bearings even when the chain is operated over a sandy road, for example.

To these and other ends the invention resides in certain improvements and combinations of parts, all as will be hereinafter more fully described, the novel features being pointed out in the claims at the end of the specification.

In the drawings:

Fig. 1 is a side elevation of a chain constructed in accordance with the preferred embodiment of the invention, with parts in vertical section;

Fig. 2 is a horizontal section through the chain illustrated in Fig. 1, with parts broken away;

Fig. 3 is a transverse vertical section through the chain illustrated in Figs. 1 and 2, illustrating a fragment of a wheel adapted to roll on the chain;

Fig. 4 is a perspective view of one of the sleeves used in the chain;

Fig. 5 is an elevation of one of the chain links detached from the associated parts;

Fig. 6 is a side view of the sealing means used for preventing entrance of foreign matter into the joints of the chain;

Fig. 7 is a side elevation of a fragment of a chain constructed in accordance with an alternative embodiment of the invention;

Fig. 8 is a horizontal section through a fragment of the chain illustrated in Fig. 7;

Fig. 9 is a transverse vertical section through the chain of Figs. 7 and 8;

Fig. 10 is a side view of one of the chain members;

Fig. 11 is a view of a sleeve and link used in the chain construction;

Fig. 12 is a plan of a chain constructed in accordance with another embodiment of the invention;

Fig. 13 is a side elevation of the chain shown in Fig. 12, with parts in section;

Fig. 14 is a transverse section taken substantially on the line 14—14 of Fig. 13, and Fig. 15 is a view similar to Fig. 14 showing a slightly different form of construction.

The same reference numerals throughout the several views indicate the same parts.

In the preferred embodiment of the invention, illustrated in Figs. 1 to 6 inclusive, there is provided a chain of sturdy and efficient construction, capable of use in many fields. For example, the chain may be used as a power transmission chain to transmit power from one sprocket or the like to another sprocket or the like. Such a chain might be employed, for instance, as the drive chain of a chain drive automobile truck.

The chain, in its preferred form, comprises a series of cross pins 20 connected to each other in pairs by links 21. Each link 21 is fixed non-rotatably to two pins, and there are two links, spaced from each other axially of the pins, connecting each two pins to each other. The links 21 may be formed integrally with the pins if desired, but preferably are separate members, shrunk, sweated, welded, or pressed onto the pins and firmly secured to them so that the pins cannot rotate in the links. The pins may each be provided with portions of slightly reduced diameter for receiving the links, and with shoulders 22 at the inner ends of the reduced portions, to form abutments against which the links may be seated when they are placed on the pins.

Rotatably mounted on each pin, between the two links 21, is a sleeve 23. If the links 21 are both made solid or integral with the pins 20, the sleeve 23 may be a split sleeve in order that it may be placed on the pin between the links, but if one or both of the links are separate members, the sleeve can be of solid construction, placed on the pin before the links 21 are fastened to the pin.

Each sleeve 23 is mounted for rotation on its pin. Preferably, a self-lubricating metallic bushing 24 is interposed between the sleeve and the pin. This bushing either may be floating, or may be secured to the pin or to the sleeve, but not to both. The links 21 fixed to the pins prevent axial movement of the sleeves 23 and bushings 24 relative to the pins, but do not interfere with oscillation of the sleeves on the pins.

The term "self-lubricating" as applied to the bushings 24 is used in its usual sense in which it is commonly employed in the trade, as meaning material which requires little or no oiling or greasing when used to form a bearing surface. Materials commonly designated as "self-lubricating" are readily available on the market, and are frequently made of bronze or brass having a considerable quantity of graphite mixed with it, or of bronze or brass of a porous nature impregnated with a considerable quantity of oil. Any suitable material of the "self-lubricating" class may be employed for the bushings 24, the purpose of the bushings being to provide a long-life bearing for oscillation of the sleeves 23 on the pins 20, requiring little or no oil or grease over long periods of time.

Means is provided for non-rotatably connecting the sleeve 23 on one pin of one connected pair of pins to the adjacent sleeve 23 on a pin of the next adjacent pair of pins. This connecting means may be in the form of links 25 non-rotatably secured to the sleeves 23 in the space between the links 21. For convenience of description, the links 21 which are fixed to the pins 20 may be spoken of as pin links, and the links 25 which are fixed to the sleeves 23 may be spoken of as sleeve links. As in the case of the links 21, the sleeve links 25 either may be formed integrally with the sleeves to which they are connected, or may be separate pieces securely fixed to the sleeves so that there is no relative rotation between the sleeves and the sleeve links.

Preferably there are two sleeve links 25 connecting each two sleeves 23 to each other, spaced from each other and placed just inside the pin links 21, as plainly shown in Fig. 2. The sleeves 23 may have a pair of reduced portions 26 for receiving the sleeve links 25 if the links are made of separate pieces of material, and the shoulders 27 at the inner edges of these reduced portions 26 provide abutments against which the links 25 may be pressed and which prevent further inward movement of the links.

Since the pin links 21 are non-rotatably fixed to the pins 20 and the sleeve links 25 are non-rotatably fixed to the sleeves 23, it is seen that flexure of the chain is accomplished by oscillation of the sleeves on the pins, and relative movement of the parts is confined exclusively to these joints formed by the sleeves on the pins. The use of self-lubricating bushings 24 at these joints provides excellent bearing surfaces, so that the bending of the chain takes place easily and smoothly, due to the lubricated nature of the joint bearings, and extremely little wear occurs.

Suitable sealing means is provided for preventing entrance of foreign matter, such as dust or sand, into the joints. Preferably, each pin link 21 is provided with two recesses 30 on the inner face of the link, to form an annular chamber around each pin. The ends of the sleeves 23 project into these chambers, as plainly shown in Figs. 2 and 3, and the sealing means is placed in these annular chambers around the ends of the sleeves.

In its preferred form, the sealing means comprises an annular ring 31 of rubber or other resilient rubber-like material, having one surface fixed to the sleeve and another surface fixed to a surface which is stationary relative to the pin. For convenience of manufacture and assembly, the rubber ring 31, as indicated especially in Fig. 6, preferably is provided with an interior metallic sleeve or shell 32 and an exterior metallic sleeve or shell 33. The sleeve 32 fits on and is tightly secured (as by a press fit or the like) to a reduced portion 34 at the end of the sleeve 23, while the outer sleeve 33 on the sealing member 31 fits tightly into and is secured to the peripheral surface of the recess 30 of the link 21, so that there is no relative movement between the sleeves 23 and 32, or between the parts 21 and 33.

The rubber or the like 31 may be vulcanized or otherwise firmly fastened to either or both of the sleeves or shells 32 or 33. Preferably it is frictionally fastened to both of them. That is, it is forced under pressure into the space between the rings 32 and 33 and presses so tightly against both of them that it is, to all intents and purposes, fixed to them. When a sleeve 23 oscillates on its pin 20, this causes corresponding oscillation of the sleeve 33 relative to the sleeve 32, and the resilience and flexibility of the rubber-like material 31 enables it to twist and deform to permit this oscillation, without causing any slipping or sliding of the material 31 on the members 32 and 33.

Thus it is seen that the sealing members 31 provide a solid block or seal at each end of each sleeve 23, and prevent grit or other foreign matter from getting between the sleeves and the pins. The resilient nature of the material 31 permits this material to deform readily, so that it does not interfere to any substantial extent with the oscillation of the parts. Since the only sliding contact is at the joint inside the sleeve 23, and since these sliding surfaces are adequately sealed by the members 31 so that grit and other foreign matter can not get to them, it follows that this construction is extremely sturdy and has a relatively long life, even when used in the immediate presence of sand or under other adverse conditions which would quickly wear out the bearings of a chain of conventional construction. No sliding contact surfaces whatever are exposed to grit or other foreign matter.

It is to be noted that when the chain is carrying a load (that is, when it is placed under tension, for example) the stress is transmitted directly from metal to metal, through the respective sleeves and pins. The load is carried, for instance, through the links 21 to one pin 20, then through the bushing 24 to the sleeve 23 surrounding that pin, then through the sleeve links 25 to the sleeve 23 on the next pin, then through the bushing 24 to the pin 20, and through the pin links 21 to the next pin, and so on. The sealing members 31 act merely as seals and normally carry no load. That is, they are under no greater compression when the chain is carrying a load than when the chain is slack. Consequently, since they are not required to carry any load, they may be made relatively thin in an axial direction so that they offer little resistance to the oscillation of the sleeves on the pins, and yet are adequate for their intended purpose of sealing the joints against entrance of foreign matter. With this construction, the rings 31 have relatively long life, for they are not disintegrated and destroyed by heavy loads, as would be the case if the load on the chain were transmitted through the resilient rings 31.

The chain constructed as above described is capable of use as a power transmission chain and in many other fields. The links 25, being spaced from each other, leave a space in which the teeth of a sprocket may engage, so that the chain may run readily over sprockets. For example, a sprocket 40 is indicated diagrammatically in dotted lines in Fig. 3, and the teeth of the sprocket extend into the holes between the sleeves 23 and links 25, while the sleeves 23 themselves may rest in the interdental spaces of the sprocket.

When it is desired to have the chain contact with wheels or other surfaces either alone or in conjunction with sprockets, then the pins 20 may be extended outwardly at each end, beyond the links 21, and may have suitable bearing blocks 45 mounted on them, for contact with wheels or any desired surfaces. Preferably, and especially when the chain is to be used as a track chain for a track laying vehicle, the blocks 45 may be made of rubber or other rubber-like material, but for some purposes, as for military use, it may be desired to make the blocks 45 of iron or steel or other non-resilient material. Each block has two holes or openings therethrough, preferably lined with metallic bushings 46, and the blocks are slipped on the projecting ends of the pins 20 with the pins extending through the bushings 46, as plainly shown in Figs. 2 and 3. A plate 47 may then be placed on the ends of the pins outside of the block 45, and nuts 48 or other securing means may hold the parts in place on the pins. Usually the two pins on which each block 45 is mounted are the pins of one pair, connected to each other by the pin links 21, so that there is no movement of the pins relative to each other and no turning of either pin in the block 45.

Frequently the blocks 45 may be damaged or worn out when the links, pins, and sealing means are still perfectly serviceable, and it is seen that these blocks 45 may be readily renewed, by unscrewing the nuts 48, taking off the worn blocks, and replacing them with new blocks, without having to disassemble the chain links or pins.

The term "rubber-like material" as applied for example, to the sealing means 31 and the bearing blocks 45, is intended to mean any natural or artificial rubber or rubber composition having the characteristics of sufficient flexibility and elasticity and permanence to be suitable under the conditions of use.

For many purposes, and especially where the chain is to run in contact with wheels, the bearing blocks 45 are provided on one side with flat surfaces as shown, for example, at 50 in Fig. 1. It is to be noted that the flat surface of each block extends to a point closely adjacent the surface of the next block, so that there is only a very slight crevice between the two blocks. Hence the series of blocks as a whole provide a flat smooth trackway over which a wheel may roll, a fragment of such a wheel being shown at 56 in Fig. 3. A chain constructed in this manner may be used in any desired way, and may engage one or more sprockets, as indicated at 40 in Fig. 3, and at other points the chain may run over or in contact with one or more wheels which engage the flat surfaces 50 of the blocks 45.

If the chain is to be used as a vehicle track chain, then preferably the blocks 45 are provided, on their sides opposite to the flat sides 50, with lugs or grousers 51 for engagement with the ground or other supporting means, which lugs 51 extend to a point materially below the bushings 23 and links 21 and 25, so that only the resilient lugs 51 come in contact with the ground or roadway and the metal parts are all held above the ground and out of contact therewith.

Whenever the chain is used in connection with wheels, whether it be as a power transmission chain or as a vehicle track chain, it may be convenient to provide guiding lugs for holding the chain laterally alined with the wheels which contact with it. For example, each link 21 may have an upwardly extending guiding lug 55 secured to it, preferably being formed integrally therewith, as shown especially in Figs. 1, 3, and 5. The wheel 56 running in contact with the chain may be of a split construction, with a peripheral groove near its center, as indicated in Fig. 3, so that the lugs 55 enter the peripheral groove as shown and keep the chain and wheel properly alined with each other.

One advantage of the chain construction above described, especially insofar as a vehicle track chain is concerned, is that the bearings or joints of the chain are entirely between the two tracks or series of bearing blocks 45, and between the links 21 which secure the pins to each other in pairs. Consequently, even if an abnormal pressure or impact against one of the blocks 45 should bend the projecting ends of the pins 20 which carry this block, this would not be likely to bend the portions of the pins which form the bearings for the sleeves 23, and thus the bearings would not be thrown out of alinement nor otherwise damaged.

An alternative construction embodying many of the advantages of the construction above described, is shown in Figs. 7 to 11 inclusive. Here, as before, the chain comprises a series of cross pins 60 non-rotatably connected to each other in pairs by links 61 which preferably are spaced from each other axially of the pins to provide an opening in which the teeth of a sprocket may engage. The links 61 may be fixed directly to the pins or, as here shown, each link may be non-rotatably connected to a sleeve 62 which in turn is tightly mounted on and non-rotatably connected to the pin 60. Thus in effect the links are fixed to and non-rotatably connected to the pins. These links may be described for convenience as pin links.

In this embodiment of the invention, each pin projects at each end beyond the pin links 61, and each projecting end of each pin is provided with a sleeve 63 rotatably mounted on it, with a self-lubricating metallic bushing 64 interposed between the sleeve and the pin, like the bushing 24 in the other embodiment of the invention. The sleeves 63 are non-rotatably connected to each other in pairs by the sleeve links 65, each of which connects a sleeve on one end of a pin of one pair to a sleeve on the corresponding end of an adjacent pin of the next pair. Hence when the chain flexes or bends, relative movement of the parts is confined to oscillation of the sleeves 63 on the pins 60.

The pin links 61 are provided, like the links 21, with recesses 67 which form annular chambers around the pins, but in this case, these recesses are on the outer surfaces of the links rather than on the inner surfaces. The inner end 68 of each sleeve 63 projects into one of these annular chambers 67, and sealing means is provided in this chamber for preventing entrance of foreign matter into the joint. The sealing means preferably is a ring 70 of rubber or other rubber-like material, which may be identical with the ring 31 previously described and which may, for convenience of manufacture and assembly, be provided with inner and outer metallic sleeves 71 and 72, fixed respectively to the sleeves 63 and the links 61.

Wherever the chain is to be used with wheels, whether as a vehicle track chain or otherwise, bearing blocks 75 may be mounted on the sleeves 63, which blocks 75 may be in general similar to the blocks 45 previously mentioned, and may have similar flat surfaces 76 providing a smooth trackway for contact with the wheel, and lugs 77 for contact with the ground if the chain is to be used on a track laying vehicle. Each block, as before, is mounted on and encircles two of the pins or rather, in this case, two of the sleeves 63 which surround the pins. Preferably the two sleeves 63 on which one block is mounted, are two which are connected to each other by a link 65, so that there is no relative movement between these sleeves and no turning of the sleeves within the blocks. Each link 65 may have an upwardly extending guiding lug somewhat similar to the lugs 55 previously mentioned.

The outer end of each pin 60 has a nut 80 or other securing means on it, preferably a castellated nut held against rotation by a cotter pin, to hold the associated sleeve 63 in place on the pin. The outer end of each sleeve 63, in turn, is preferably threaded so that an imperforate cap 81 may be screwed on it, which cap envelops and encloses the nut 80 and end of the pin 60, and at the same time presses at its inner edge against a plate 82 lying against the block 75 to hold the block in place on the sleeve. A part 83 at each end of the plate 82 may be bent against a flat side of the adjacent cap nut 81 to hold the cap nut against rotation.

Thus the cap 81 provides an effective seal for the outer end of each sleeve 63 and prevents entrance of foreign matter into the sleeve. The inner end of each sleeve is effectively sealed by the resilient rubber-like material 70 which likewise prevents entrance of foreign matter without materially interfering with the flexibility of the chain.

In Figs. 12, 13, and 14 is shown still another embodiment of chain constructed according to the present invention. The chain is here made up of pin links 90 non-rotatably connected to the cross pins 91 to connect these pins to each other in pairs, and sleeves 92, one surrounding each pin between the pin links 90, and sleeve links 93, which in the present instance are shown as integral with the sleeves 92, the two sleeves 92 and two attached links 93 being all formed from a single piece of suitable metal as by forging or the like.

In this instance, the self-lubricating bushing is not employed between the sleeves and the pins, but a roller bearing is provided between these members, which roller bearing may comprise a series of rollers 95 of relatively small diameter making up what is sometimes referred to in the art as a needle bearing. It will be obvious that any suitable form of bearing such as this needle bearing, could be employed also in the other forms of chains previously described with reference to Figs. 1-11 of the drawings. The roller bearing may be initially packed with oil or grease so that it will require no further lubrication for a long period of time.

As before, sealing means is provided for preventing entrance of foreign matter into the bearing, and also for preventing escape of oil or grease from the bearing. For example, each sleeve 92 or link 93 may have a recess formed in its outer surface surrounding each pin 91 and in each such recess is placed sealing means such as a ring 96 of rubber or other rubber-like material, which ring may for convenience of manufacture and assembly be provided with inner and outer metallic sleeves as in the previously described embodiments. The inner sleeve of each ring fits tightly on the pin 91 so that it cannot move thereon while the outer sleeve on each rubber-like ring fits tightly in the recess in the sleeve 92 or link 93. Thus, as before, the sealing means prevents entrance of any foreign matter into the bearing, or escape of lubricant from the bearing, but the sealing means normally carries no load, the load being transmitted through the direct metal to metal contact of the parts 91, 95, and 92.

Nuts 98 provided with lock washers 99 may be secured to the ends of the pins 91 to assist in holding the links 90 in place if the chain is to be used as a transmission chain or the like; or if desired, the pins 91 may be extended at one or both ends so that blocks or other members may be mounted on them as illustrated in the preceding embodiments of this invention. A sprocket, of which a fragment is illustrated at 100, may engage the chain as plainly shown in the drawings and as will be apparent to those skilled in the art.

In Fig. 15 there is illustrated a chain which may be identical with that shown in Figs. 12, 13, and 14 except that a self-lubricating bushing 105 is employed between the pin and the sleeve in place of the roller bearing 95. The other parts of this construction are indicated by the same reference numerals used in Figs. 12, 13, and 14 for the corresponding parts, with the addition of the letter "a" to each numeral.

Thus in all of the constructions, a flexible and highly efficient chain is provided, which requires little or no attention in the line of oiling and greasing, and yet which can be run effectively in a room laden with dust or grit (in the case of a power transmission chain) or over sandy ground (in the case of a vehicle track chain) without danger of the grit or other foreign matter getting into the bearings of the chain and wearing the bearings badly, as would be done rapidly if no such sealing means were provided.

In all forms of chain here illustrated, the resilient sealing means acts only as a seal and does not transmit loads. Consequently, even after long continued use, this sealing means stands up well and continues to perform its function without being disintegrated and broken up.

The chain may be of any desired size or proportions, depending on the use to which it is to be put. Extremely satisfactory results have been obtained from a chain of a two-inch pitch (that is, the cross pins being spaced two inches center to center) used as a track chain for a vehicle of the track laying type.

The same arrangement herein disclosed for excluding foreign matter from chain bearings might also be employed with advantage in connection with any other oscillating bearing or joint.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

We claim:

1. A chain comprising a series of pins, a metallic member rotatably mounted on and having a substantial bearing on each pin, a pin link non-rotatably secured to each pin and extending in one direction, a second link non-rotatably secured to each member and extending in an opposite direction, each member having a portion projecting beyond the link secured to that member in a direction toward its associated pin link, said pin link having a recess surrounding said projecting portion of the member, and a resilient ring in said recess connected to said pin link and to said projecting portion of said member and acting as a seal for impeding entrance of foreign matter between its associated member and pin.

2. A chain comprising a series of cross pins, a series of pin links connecting said pins to each other in pairs, said pin links being non-rotatably connected to their respective pins and said pins projecting at both ends materially beyond said links, a series of metallic sleeves, one rotatably mounted on each projecting end of each pin and normally having a substantial bearing on its pin, a series of sleeve links each non-rotatably connected to a sleeve on one end of a pin of one pair and to a sleeve on the corresponding end of a pin of an adjacent pair, and sealing means of resilient rubber-like material associated with each sleeve to obstruct foreign matter from entering said sleeves.

3. A chain comprising a series of cross pins, a series of pin links connecting said pins to each other in pairs, said pin links being non-rotatably connected to their respective pins and said pins projecting at both ends materially beyond said links, a series of metallic sleeves, one rotatably mounted on each projecting end of each pin and normally having a substantial bearing on its pin, a series of sleeve links each non-rotatably connected to a sleeve on one end of a pin of one pair and to a sleeve on the corresponding end of a pin of an adjacent pair, a cap secured to the outer end of each sleeve and enclosing the corresponding end of the pin on which the sleeve is mounted, to prevent foreign matter from entering the outer ends of the sleeves, and resilient sealing means at the inner end of each sleeve, interposed between and connected both to the sleeve and to an adjacent pin link, to prevent foreign matter from entering the inner ends of the sleeves.

4. A chain comprising a series of cross pins, a series of blocks of rubber-like material each mounted on and encircling two of said pins, said blocks having lower surfaces adapted to rest upon a supporting surface and upper surfaces adapted to form a substantially continuous and smooth trackway over which a wheel may roll smoothly, a metallic member rotatably mounted on and in contact with each pin, link means non-rotatably connecting each metallic member with another metallic member on a different pin, and sealing means comprising resilient rubber-like material associated with each metallic member for preventing entrance of foreign matter between the metallic member and its associated pin.

5. A chain comprising a series of cross pins, a series of blocks of rubber-like material each mounted on and encircling two of said pins, said blocks having lower surfaces adapted to rest upon a supporting surface and upper surfaces adapted to form a substantially continuous and smooth trackway over which a wheel may roll smoothly, a metallic sleeve rotatably mounted on each pin, a self-lubricating metallic bushing interposed between each sleeve and its associated pin, link means non-rotatably connecting said pins to each other in pairs, other link means non-rotatably connecting each sleeve with one sleeve on a different pair of pins, and a sealing ring of rubber-like material associated with each sleeve to prevent foreign matter from entering between the sleeve and its associated pin, each ring having one edge fixed to its sleeve and another edge fixed to a surface which is in fixed position relatively to the corresponding pin, so that oscillation of the sleeve on the pin is accompanied by deformation of the ring and so that the ring maintains a tight seal notwithstanding said oscillation.

6. A chain comprising two spaced series of blocks of rubber-like material, said blocks having substantially flat upper surfaces extending to points closely adjacent the upper surfaces of adjacent blocks of the same series, a series of pins extending crosswise of said series of blocks, each pin extending into and being connected to a block of each series and there being two pins extending into each block, a series of connecting means each encircling and having a bearing on one pin extending into one block and an adjacent pin extending into a different block, the bearings of said connecting means on said pins being wholly between said two series of blocks and substantially unaffected by deformation of the portion of a pin extending into a block, and two sealing rings of rubber-like material associated with each pin adjacent opposite sides of the connecting means encircling the pin and forming a flexible tight seal to prevent entrance of foreign matter between the pin and its encircling connecting means.

7. A chain comprising two spaced series of blocks of rubber-like material, said blocks having substantially flat upper surfaces extending to points closely adjacent the upper surfaces of adjacent blocks of the same series, a series of pins extending crosswise of said series of blocks, each pin extending into and being connected to a block of each series and there being two pins extending into each block, a series of links connecting said pins non-rotatably to each other in pairs, there being two spaced links connecting the pins of each pair to each other, one adjacent the inner surface of one series of blocks and the other adjacent the inner surface of the other series of blocks, each link being recessed to provide an annular chamber surrounding each pin on the inner face of the link, a sleeve surrounding each pin between said links and projecting at each end into one of said chambers, a self-lubricating metallic bushing interposed between each pin and its surrounding sleeve, means connecting each sleeve non-rotatably to a sleeve on an adjacent pair of pins, and a body of rubber-like material encircling each of said sleeves within each of said chambers and tightly connected both to the sleeve and to the adjacent link, to provide a seal for preventing entrance of foreign matter into the sleeve without materially interfering with oscillation of the sleeve on its pin.

8. A chain comprising a series of cross pins, two sleeves mounted for oscillation on each pin adjacent opposite ends of the pin with a space between them, means non-rotatably connecting each sleeve to one other sleeve on the corresponding end of a different pin, two series of blocks of rubber-like material, each block encircling and being mounted on two of said sleeves and each having a substantially flat upper surface extending to a point closely adjacent the upper surfaces of adjacent blocks of the same series, one series of blocks being mounted on the sleeves at corresponding ends of the several pins and the other series of blocks being mounted on the sleeves at the opposite ends of the pins, a cap secured to the outer end of each sleeve and enveloping the corresponding end of the associated pin to prevent entrance of foreign matter between the sleeve and the pin at their outer ends, at least some of said caps serving also to retain said blocks on said sleeves, and sealing means comprising an annular ring of rubber-like material adjacent the inner end of each sleeve for preventing entrance of foreign matter between the inner end of the sleeve and the pin, without materially interfering with oscillation of the sleeves on the pins.

9. A chain comprising a series of cross pins, a series of links connecting said pins to each other in pairs, the two pins of each pair being connected to each other by two links spaced from each other longitudinally of the pins and the pins projecting outwardly beyond the links at each end, each link having a recess providing an annular chamber surrounding each pin on the outer face of the link, a series of sleeves, one rotatably mounted on each outwardly projecting end of each pin, each sleeve having its inner end projecting into one of said annular chambers, a self-lubricating metallic bushing interposed between each sleeve and its pin, means non-rotatably connecting each sleeve on one pair of pins to a sleeve on a pin of an adjacent pair, a ring of rubber-like material surrounding each sleeve within its said chamber and secured to the sleeve and to a wall of the chamber to provide a seal to prevent entrance of foreign matter into the inner end of the sleeve, bearing blocks of rubber-like material mounted on said sleeves, each block encircling two sleeves and projecting downwardly to a point below the bottoms of said links and connecting means when said chain is laid horizontally, and cap means on the outer ends of said sleeves for holding said blocks on said sleeves and sealing the outer ends of the sleeves to prevent entrance of foreign matter.

10. A chain comprising a series of cross pins, a sleeve surrounding each pin and mounted for oscillation relative thereto, a self-lubricating metallic bushing interposed between each pin and its surrounding sleeve, said sleeve, bushing, and pin being normally in contact with each other so that tension stress in said chain is normally transmitted from said sleeve through said bushing to said pin, a link fixed to each pin for connecting said pin to an adjacent pin on one side, a link fixed to each sleeve for connecting said sleeve to an adjacent sleeve on the opposite side, a pair of shells associated with each pin, one shell of each pair being tightly secured to one element and the other shell of each pair being tightly secured to another element capable of oscillation with respect to the element to which the first bushing of the pair is secured, and a resilient body of rubber-like material interposed between the two shells of each pair and tightly engaging both of them, said resilient body normally carrying no substantial part of tension stress in the chain but acting as a seal to prevent entrance of foreign matter between said sleeve and said pin.

11. A chain comprising a series of units articulated to each other, one of said units including pin means and link means rigidly connected thereto, another of said units including sleeve means surrounding said pin means and link means rigidly connected to said sleeve means, metallic bearing means between said pin means and said sleeve means for transmitting stress from one of said units to the other, and sealing means to prevent access of foreign matter to said bearing means, said sealing means including a shell tightly secured to one of said units, a second shell spaced therefrom and tightly secured to the other of said units, and a filling of resilient rubber-like material interposed between said two shells and tightly engaging both of them, said filling normally carrying substantially no load of stress between said two units and being readily deformable without disintegration when said two shells move relatively to each other upon oscillation of one of said units relatively to the other.

FRANCIS E. CUNNINGHAM.
DAVID FERGUSSON.